US012540804B1

(12) United States Patent
Hall et al.

(10) Patent No.: US 12,540,804 B1
(45) Date of Patent: Feb. 3, 2026

(54) DRAG REDUCTION FIN DEPLOYMENT MECHANISM

(71) Applicant: BAE Systems Information and Electronic Systems Integration Inc., Nashua, NH (US)

(72) Inventors: Matthew M. Hall, Nashua, NH (US); Jack T. Nigro, Nashua, NH (US); Elizabeth A. Deloia, Westford, MA (US); Ross J. Wendell, Medford, MA (US); Richard N. Jorgenson, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 18/892,105

(22) Filed: Sep. 20, 2024

(51) Int. Cl.
*F42B 10/14* (2006.01)
*B64C 5/06* (2006.01)
*B64D 1/00* (2006.01)
*B64U 70/50* (2023.01)

(52) U.S. Cl.
CPC ................ *F42B 10/14* (2013.01); *B64C 5/06* (2013.01); *B64D 1/00* (2013.01); *B64U 70/50* (2023.01)

(58) Field of Classification Search
CPC .. F42B 10/14; B64C 5/06; B64D 1/00; B64U 70/50
See application file for complete search history.

(56) References Cited

U.S. PATENT DOCUMENTS

| | | | | |
|---|---|---|---|---|
| 3,974,774 A * | 8/1976 | Schaffner | F41F 3/077 | 89/1.816 |
| 5,211,357 A * | 5/1993 | Leidenberger | F42B 10/14 | 244/3.28 |
| 5,582,364 A * | 12/1996 | Trulin | F42B 10/14 | 244/3.29 |
| 6,443,391 B1 | 9/2002 | Malejko et al. | | |
| 11,624,594 B1 * | 4/2023 | Neal, III | F42B 10/64 | 244/3.27 |
| 2007/0018033 A1 * | 1/2007 | Fanucci | F42B 15/22 | 244/49 |
| 2010/0012774 A1 * | 1/2010 | Fanucci | F42B 12/365 | 244/49 |
| 2012/0025010 A1 * | 2/2012 | Firor | F42B 10/64 | 244/3.27 |
| 2012/0068002 A1 * | 3/2012 | Unger | F42B 10/64 | 244/3.28 |

* cited by examiner

*Primary Examiner* — Rodney A Bonnette
(74) *Attorney, Agent, or Firm* — Sand, Sebolt & Wernow LPA; Gary McFaline

(57) ABSTRACT

A projectile having a body that includes a nose, a tail opposite to the nose, a chamber defined between the tail and the nose, and a longitudinal axis defined between the nose and the tail. The projectile also includes a payload stored in the chamber of the body, and a propulsion system equipped with the body. The projectile also includes a fin assembly operably engaged with the body between the nose and the tail and is positioned outside of the chamber, wherein a fin of the fin assembly is moveable between a stowed position and a deployed position. In the stowed position, the fin is stowed completely between the nose and the tail. In the deployed position, a portion of the fin extends away from the nose or from the tail.

17 Claims, 8 Drawing Sheets

DRAG REDUCTION FIN DEPLOYMENT MECHANISM

STATEMENT OF GOVERNMENT INTEREST

This invention was made with government support under Prime Contract No. 21 C8099 awarded by a classified U.S. agency. The government has certain rights in the invention.

TECHNICAL FIELD

The present disclosure generally relates to a fin assembly on a projectile or aerial vehicle.

BACKGROUND ART

In the field of aerodynamics, as applied to aerial vehicles or projectiles, fins, canards, wings, and other similar aerodynamic elements of the like are commonly equipped to one or more locations along aerial vehicles or projectiles. Generally, fins are equipped to one or more locations that are positioned circumferentially about the projectile between an aft section of the projectile and a fore section of the projectile. Normally, the use and purpose of equipping fins, canards, and wings to projectiles provide stability, control, lift, and other aerodynamic capabilities to the projectile as the projectile is in flight. It should be understood that based on the size, shape, and configuration of the projectile, any suitable number of fins, canards, and wings may be fitted to the projectile to provide the optimal aerodynamic capabilities for the intended use of the projectile.

In certain situations, however, fins equipped to projectile may be detrimental to the overall aerodynamic profile of the projectile. In one instance, fixed or stationary fins equipped to a projectile may be necessary for a given projectile or aerial vehicle due to various reasons, including thrust or propulsion energy that is generated from the on-board propulsion system of the projectile. While such configuration is crucial for given projectiles of this instance, such fixed or stationary fins may increase the overall aerodynamic drag along the profile of the projectile thus reducing the overall air speed and maneuverability of the projectile in flight. In another instance, such fins may be retractable inside of a given projectile to conserve the overall profile of the projectile in a stowed position. In this instance, however, such retractable fins required in these projectiles require internal space defined inside of the projectile to house such fins. With such structural configuration, these types of projectiles must allocate storage space to such fins instead of other necessary projectile equipment, including guidance systems, payloads, and other equipment of the like, or increase the overall profile of these projectiles which would increase the overall aerodynamic drag along said projectiles.

SUMMARY OF THE INVENTION

In one aspect, an exemplary embodiment of the present disclosure may provide a projectile. The projectile includes a body having a nose, a tail opposite to the nose, a chamber defined between the tail and the nose, and a longitudinal axis defined between the nose and the tail. The projectile also includes a payload stored in the chamber of the body; a propulsion system equipped with the body; and a fin assembly operably engaged with the body between the nose and the tail and is positioned outside of the chamber. The fin assembly includes: a fin having a first end and a second end opposite to the first end, wherein the fin is moveable between a stowed position and a deployed position; a pivot member pivotably engaging the first end of the fin with a base of the fin assembly formed with the body; a biaser operably engaged with the fin and the base, wherein the biaser is configured to apply a biasing force on the fin to pivot the fin from the stowed position to the deployed position; and a slot defined between a top end of the body and a bottom end operably engaged with the body and being opposite to the top end, wherein the biaser and a portion of the fin are housed inside of the slot; wherein when the fin is in the stowed position, the fin is stowed completely between the nose and the tail; and wherein when the fin is in the deployed position, a portion of the fin extends away from the nose or from the tail.

This exemplary embodiment or another exemplary embodiment may further include that when the fin is in the stowed position, the first end of the fin is rearward from the second end of the fin. This exemplary embodiment or another exemplary embodiment may further include that when the fin is in the deployed position, the first end of the fin is forward of the second end of the fin. This exemplary embodiment or another exemplary embodiment may further include that when the fin is in the stowed position, the fin is substantially parallel to the longitudinal axis of the body. This exemplary embodiment or another exemplary embodiment may further include that when the fin is in the deployed position, the fin is non-parallel to the longitudinal axis of the body. This exemplary embodiment or another exemplary embodiment may further include that the base further comprises: a ramp positioned inside of the slot and configured to guide the biaser inside of the slot; wherein a portion of the ramp restrains the fin at the deployed position. This exemplary embodiment or another exemplary embodiment may further include a retaining pin operably engaging the base and a first end of the biaser with one another; and an anchor extending outwardly from the fin and operably engaging a second end of the biaser and the fin with one another. This exemplary embodiment or another exemplary embodiment may further include a first length defined between the first end of the biaser and the second end of the biaser when the fin is in the stowed position; and a second length defined between the first end of the biaser and the second end of the biaser when the fin is in the deployed position; wherein the first length is greater than the second length. This exemplary embodiment or another exemplary embodiment may further include that the fin of the fin assembly defines a rhombus-shaped cross section.

In another aspect, an exemplary embodiment of the present disclosure may provide a fin assembly of a projectile. The fin assembly includes a base formed on a body of the projectile; a fin having a first end and a second end opposite to the first end; a pivot member pivotably engaging the first end of the fin with the base between a stowed position and a deployed position external to a chamber of the projectile; a biaser operably engaged with the fin and the base and positioned inside of the base, wherein the biaser is configured to apply a biasing force on the fin to pivot the fin from the stowed position to the deployed position; and a slot defined between a top end of the body and a bottom end operably engaged with the body and being opposite to the top end; wherein the biaser and a portion of the fin are housed inside of the slot; and wherein the fin is moveable between a stowed position and a deployed position.

This exemplary embodiment or another exemplary embodiment may further include that when the fin is in the stowed position, the first end of the fin is rearward of the second end of the fin. This exemplary embodiment or another exemplary embodiment may further include that when the fin is in the deployed position, the first end of the fin is positioned forward of the second end of the fin. This exemplary embodiment or another exemplary embodiment may further include that the biaser is configured to apply a biasing force on the fin to pivot the fin from the stowed position to the deployed position. This exemplary embodiment or another exemplary embodiment may further include that when the fin of each fin assembly of the set of fin assemblies is in the stowed position, the fin is substantially parallel to a longitudinal axis of a body of the projectile. This exemplary embodiment or another exemplary embodiment may further include that when the fin of each fin assembly of the set of fin assemblies is in the stowed position, the fin is non-parallel to a longitudinal axis of a body of the projectile. This exemplary embodiment or another exemplary embodiment may further include a retaining pin operably engaging the base and a first end of the biaser with one another; and an anchor extending outwardly from the fin and operably engaging a second end of the biaser and the fin with one another.

In yet another aspect, an exemplary embodiment of the present disclosure may provide a method. The method includes steps of installing a base of a fin assembly with a body of an aerial vehicle, wherein the base is positioned on an outer surface of the body; installing a first end of a fin of the fin assembly inside the base of the fin assembly; pivotably engaging the first end of the fin to the base with a pivot member of the fin assembly; and biasing the first end of the fin, by a biaser of the fin assembly, from a stowed position to a deployed position.

This exemplary embodiment or another exemplary embodiment may further include a step of positioning the first end of the fin rearward of a second end of the fin when the fin of the fin assembly is in the stowed position, wherein the second end of the fin is longitudinally opposite to the first end of the fin. This exemplary embodiment or another exemplary embodiment may further include a step of positioning the first end of the fin forward of a second end of the fin when the fin is in the deployed position, wherein the second end of the fin is longitudinally opposite to the first end of the fin. This exemplary embodiment or another exemplary embodiment may further include steps of engaging a retaining pin of the fin assembly with the base; engaging a first end of the biaser with an anchor of the fin; and engaging a second end of the biaser with the retaining pin of the fin assembly.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
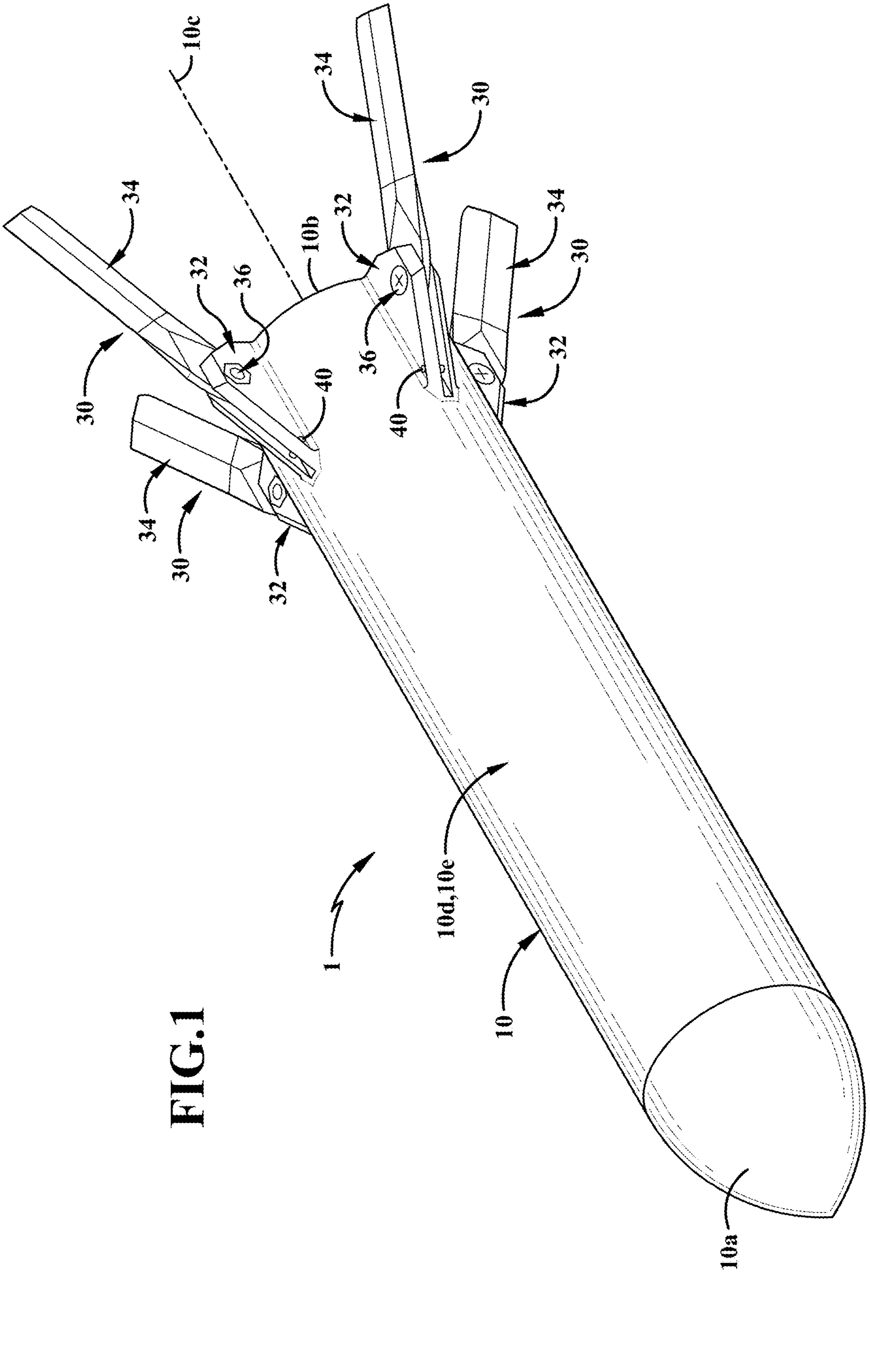
FIG. 1 (FIG. 1) is a top, front isometric perspective view of a projectile equipped with a set of fin assemblies in accordance with one aspect of the present disclosure.
Figure 2:
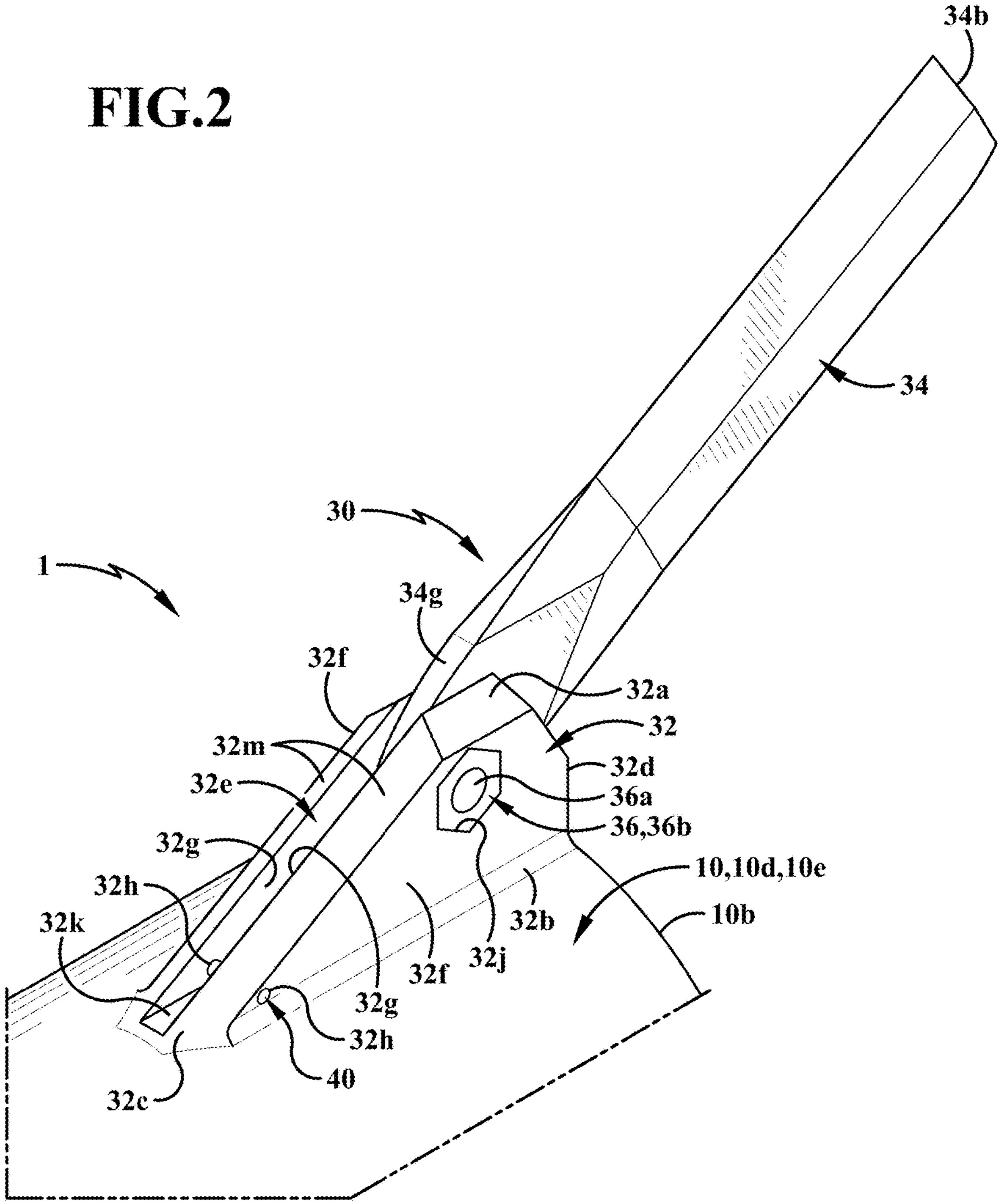
FIG. 2 (FIG. 2) is a partial top, front isometric perspective view of one of the fin assemblies of the set of fin assemblies.

FIG. 1 illustrates a projectile, aerial vehicle, or airborne weapon 1 that is operable to be launched from a platform. Projectile 1 includes a body 10 that has a fore end or nose 10*a*, an aft end or tail 10*b* that is longitudinally opposite to the nose 10*a*, and a longitudinal axis 10*c* that extends between the nose 10*a* and the tail 10*b*; such longitudinal axis is denoted by a dashed line labeled 10*c* in FIG. 1. Body 10 also includes a cylindrical wall 10*d* that extends from the nose 10*a* to the tail 10*b* along the longitudinal axis 10*c*. Cylindrical wall 10*d* includes an outer surface 10*e* that extends between the nose 10*a* and the tail 10*b* and is intended to interact with and being in communication with the external environment surrounding projectile 1.

Figure 6A:
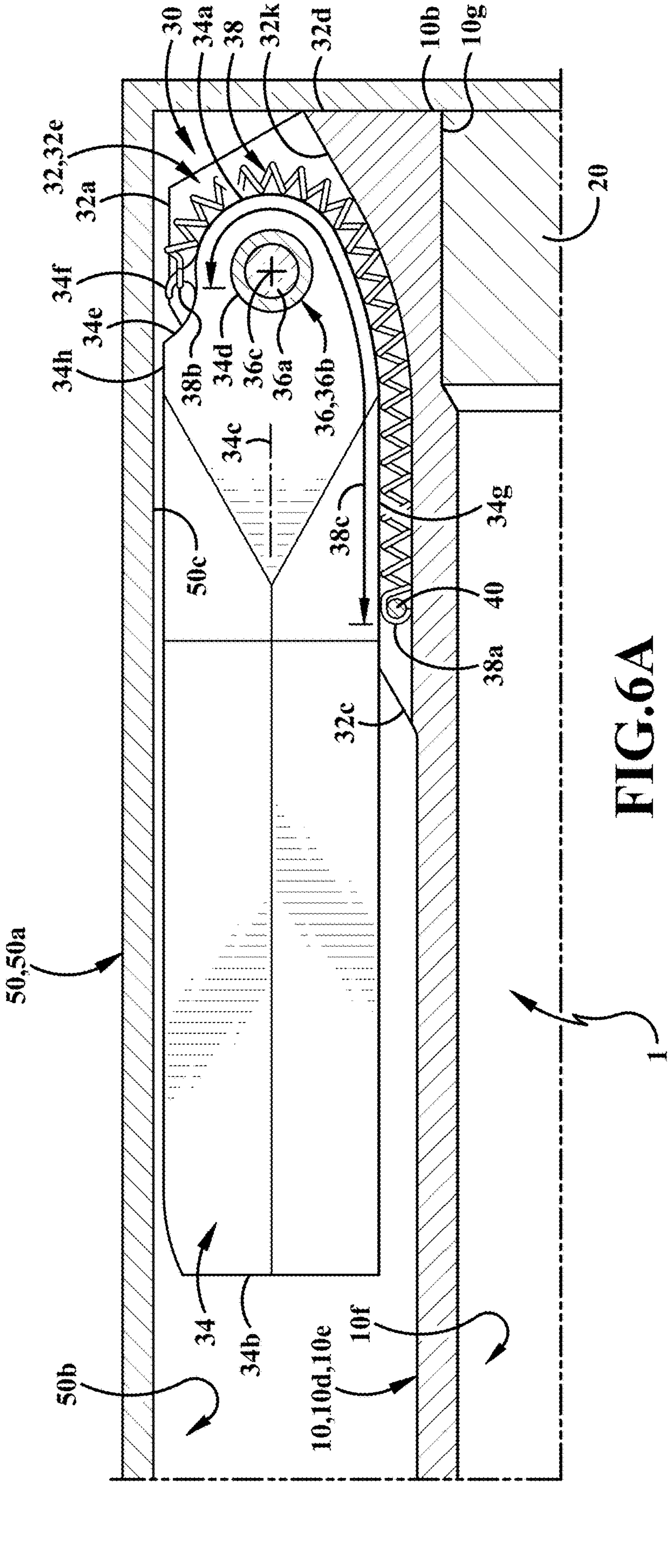
FIG. 6A (FIG. 6A) is a sectional view of the fin assembly taken in the direction of line 6A-6A as shown in FIG. 5.
Figure 6B:
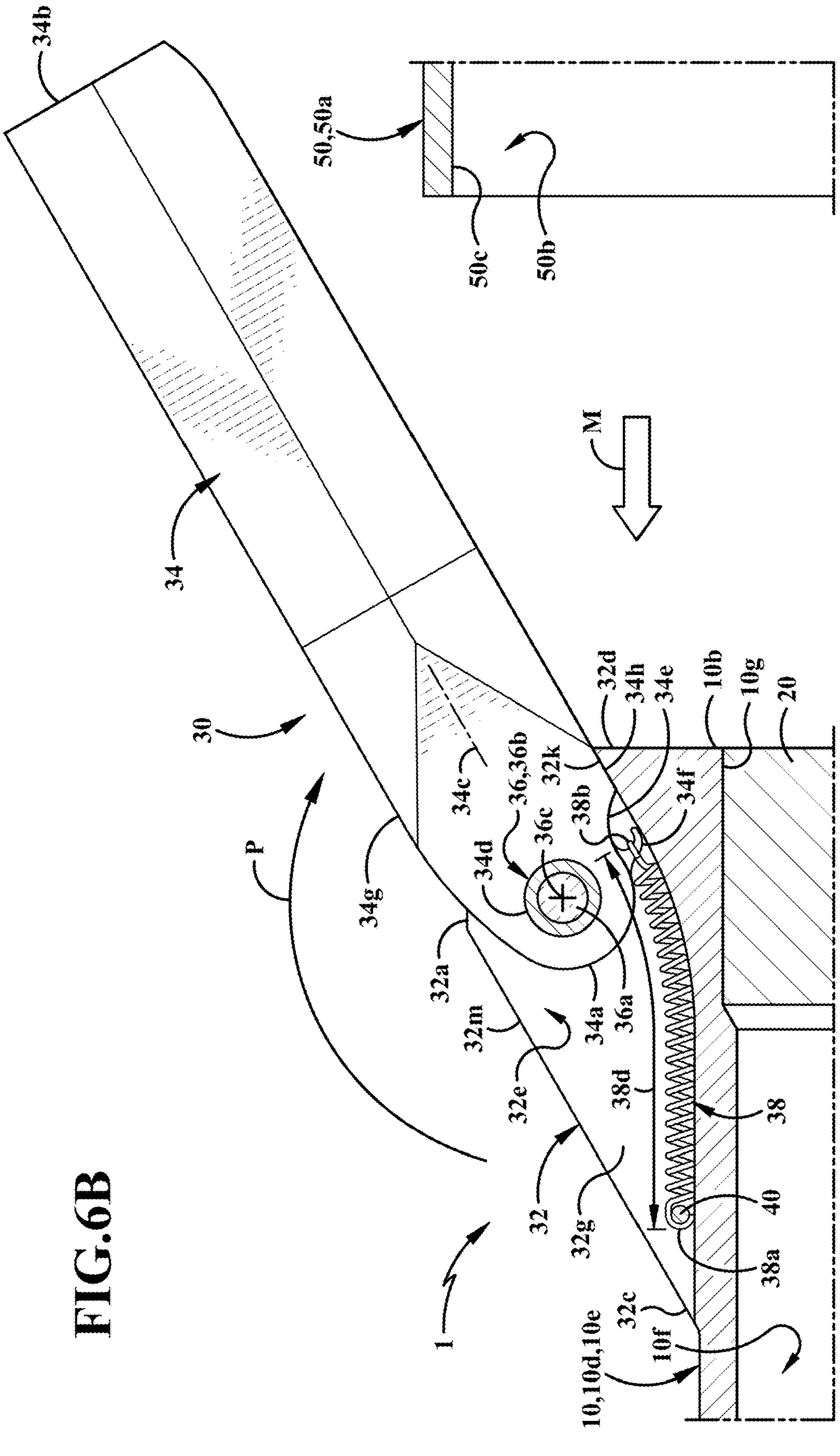
FIG. 6B (FIG. 6B) is a sectional view of the fin assembly shown in FIG. 6A, wherein the fin of the fin assembly is in the deployed position outside of the launch tube.

Body 10 also defines a chamber 10*f* that is accessible at an opening 10*g* defined in the tail 10*b* (see FIGS. 6A-6B). In this present disclosure, body 10 is configured to at least house a propulsion system 20 (see FIG. 6A) inside of the chamber 10*f*. In other embodiments not illustrated herein, chamber 10*f* may be configured to house necessary components in order for projectile 1 to be launched from a platform, including any guidance or navigational systems or components, payloads or munitions, and other various devices or components that are essential to projectile 1 as dictated by the implementation of said projectile 1.

It should be understood that projectile 1 may also include other various components not illustrated herein that are conventionally equipped to projectile 1. Such components that may be included with projectile 1 include, but are not limited to, a payload or warhead housed inside of the chamber 10*f* of body 10, a guidance kit or system operably engaged with the body 10 that is configured to guide and steer the projectile 1 to a desired target or point of interest for a desired operation, and other conventional and/or suitable components that may be equipped to projectile for a desired military purpose.

Figure 3:
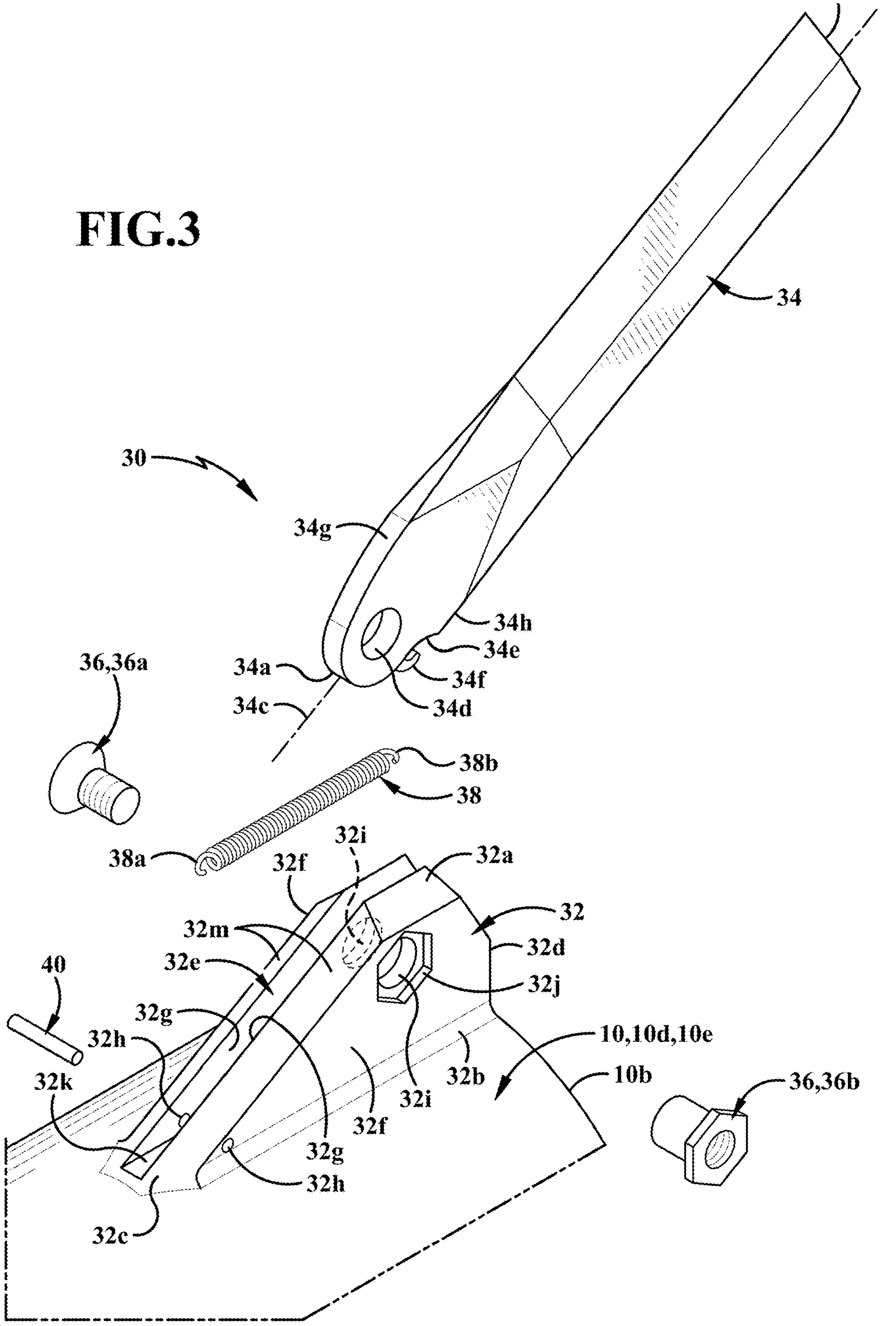
FIG. 3 (FIG. 3) is an exploded view of the fin assembly shown in FIG. 2.

Projectile 1 also includes a set of fin assemblies 30 that is equipped to the body 10 for providing stability and controlled direction when projectile 1 is in flight. As best seen in FIG. 3, each fin assembly of the set of fin assemblies 30 includes a base 32 that is formed with the cylindrical wall 10*d* at the tail 10*b* of the body 10. Base 32 includes a top end 32*a* that is spaced apart from the body 10, a bottom end 32*b* that is opposite to the top end 32*a* and is formed with the cylindrical wall 10*d* of the body 10, and a vertical direction extending from the top end 32*a* to the bottom end 32*b*. Base 32 also includes a front end 32*c* that is spaced apart from the tail 10*b*, a rear end 32*d* that is opposite to the front end 32*c* and is disposed at the tail 10*b*, and a longitudinal direction extending from the front end 32*c* to the rear end 32*d*.

Still referring to base 32, base 32 also defines a slot 32*e*. As best seen in FIG. 3, slot 32*e* extends vertically downwardly into the base 32 from the top end 32*a* to the bottom end 32*b*. With such slot 32*e*, the base 32 is bifurcated into two portions or sections that are spaced apart from one another but are connected together at a ramp of the base 32 positioned near the bottom end 32*b*; such ramp is described in greater detail below. With such bifurcation, base 32 also includes a pair of external walls 32*f* that extends longitudinally from the front end 32*c* to the rear end 32*d* along each portion of the base 32. With such bifurcation, base 32 also includes a pair of internal walls 32*g* that extends longitudinally from the front end 32*c* to the rear end 32*d* along each portion of the base 32 inside of the slot 32*e*.

Still referring to base 32, base 32 defines a pair of front openings 32*h* and a pair of rear openings 32*i*. As best seen in FIG. 3, each front opening of the pair of front openings 32*h* extends transversely through a respective bifurcated section of base 32 from the external wall 32*f* to the internal wall 32*g*. In this configuration, the external wall 32*f* and the internal wall 32*g* of each bifurcated section of base 32 are in communication with one another at the respective front opening 32*h*. It should be noted that the front openings 32*h* are also coaxial with one another for receiving a retaining pin of the fin assembly 30, which is discussed in greater detail below.

Similarly, as best seen in FIG. 3, each rear opening of the pair of rear openings 32*i* extends transversely through a respective bifurcated section of base 32 from the external wall 32*f* to the internal wall 32*g*. In this configuration, the external wall 32*f* and the internal wall 32*g* of each bifurcated section of base 32 are also in communication with one another at the respective rear opening 32*i*. It should be noted that the rear openings 32*i* are also coaxial with one another for receiving a pivot member of the fin assembly 30, which is discussed in greater detail below. With respect to the pair of rear openings 32*i*, one of the rear openings is also countersunk such that a recess 32*j* is defined in the base 32. As discussed in greater detail below, the pivot member of the fin assembly 30 may engage with the base 32 inside of the recess 32*j* to prevent said pivot member from backing out or loosening from the base 32.

Still referring to base 32, base 32 also includes a ramp or sloped base wall 32*k*. As best seen in FIGS. 6A-6B, the ramp 32*k* extends upwardly in the longitudinal direction of the base 32 from the front end 32*c* to the rear end 32*d*. The ramp 32*k* is also positioned between the bifurcated portions of the base 32 where the ramp 32*k* acts as the bridge or connection between these bifurcated portions of the base 32. In the present disclosure, the ramp 32*k* increases in elevation or height as an incline of the ramp 32*k* proceeds from the front end 32*c* to the rear end 32*d*. When viewed from a side cross-sectional view (see FIG. 6A), the ramp 32*k* defines a curvilinear shape as the incline of the ramp 32*k* proceeds from the front end 32*c* to the rear end 32*d*. As discussed in greater detail below, such incline defined in the ramp 32*k* may act as a guide or channel for a biaser of the fin assembly 30 as the biaser translates from a first length or expanded length to a second length of compressed length. As also discussed in greater detail below, a portion of ramp 32*k* may act as a hard stop for a fin of a respective fin assembly 30 to remain in a deployed position when the fin translates from a stowed position to said deployed position.

Still referring to base 32, base 32 also includes a pair of angled walls 32*m*. As best seen in FIG. 3, each angled wall 32*m* extends downwardly from the top end 32*a* towards the bottom end 32*b* at angle measured relative to the external wall 32*f* of the respective bifurcated portion of the base 32; such angle at which each angled walls is disposed at is denoted as "a" in FIG. 5. It should be understood that the angle at which each angled wall 32*m* is defined at corresponds to and/or matches with an angle of a wall of a launcher that the projectile 1 is housed in prior to be launched; such launcher is discussed in greater detail below.

Each fin assembly of the set of fin assemblies 30 also includes a fin 34. As best seen in FIG. 3, fin 34 includes a first end 34*a*, a second end 34*b* that is longitudinally opposite to the first end 34*a*, and a longitudinal direction 34*c* extending from the first end 34*a* to the second end 34*b*. Fin 34 also defines a pivot opening 34*d* at the first end 34*a* of the fin 34 for pivotably and/or rotatably engaging the fin 34 to the base 32; such pivot engagement between the base 32 and the fin 34 is discussed in greater detail below. Fin 34 also defines a notch 34*e* at the first end 34*a* of the fin 34 that is spaced apart from the pivot opening 34*d*; such pivot opening 34*d* and notch 34*e* are free from being in communication with one another. Fin 34 also includes an anchor or hook 34*f* that extends outwardly from the fin 34 and into the notch 34*e*. As best seen in FIG. 6A, the anchor 34*f* is adjacent to and spaced apart from the pivot opening 34*d*. As discussed in greater detail below, anchor 34*f* is operable to engage with a biaser of the fin assembly 30 to assist in pivoting the fin 34 from a stowed position to a deployed position when launched from a platform.

Still referring to fin 34, fin 34 includes a first side 34*g* and a second side 34*h*. As best seen in FIGS. 2-3 and FIGS. 6A-6B, first side 34*g* of fin 34 is positioned between the first end 34*a* and the second end 34*b*, second side 34*h* of fin 34 is positioned between the first end 34*a* and the second end 34*b* and transversely opposite to the first side 34*g*, and a transverse direction extending from the first side 34*g* to the second side 34*h*. Depending on the orientation of the fin 34 between stowed and deployed positions, the first and second side 34*g*, 34*h* may be positioned at different vertical positions. In the stowed position (see FIG. 6A), the first side 34*g* is positioned at a first vertical position, and the second side 34*h* is positioned at a second vertical position that is above the first vertical position. In the deployed position (see FIG. 6B), the first vertical position of the first side 34*g* is above the second vertical position of the second side 34*h*.

Figure 5:
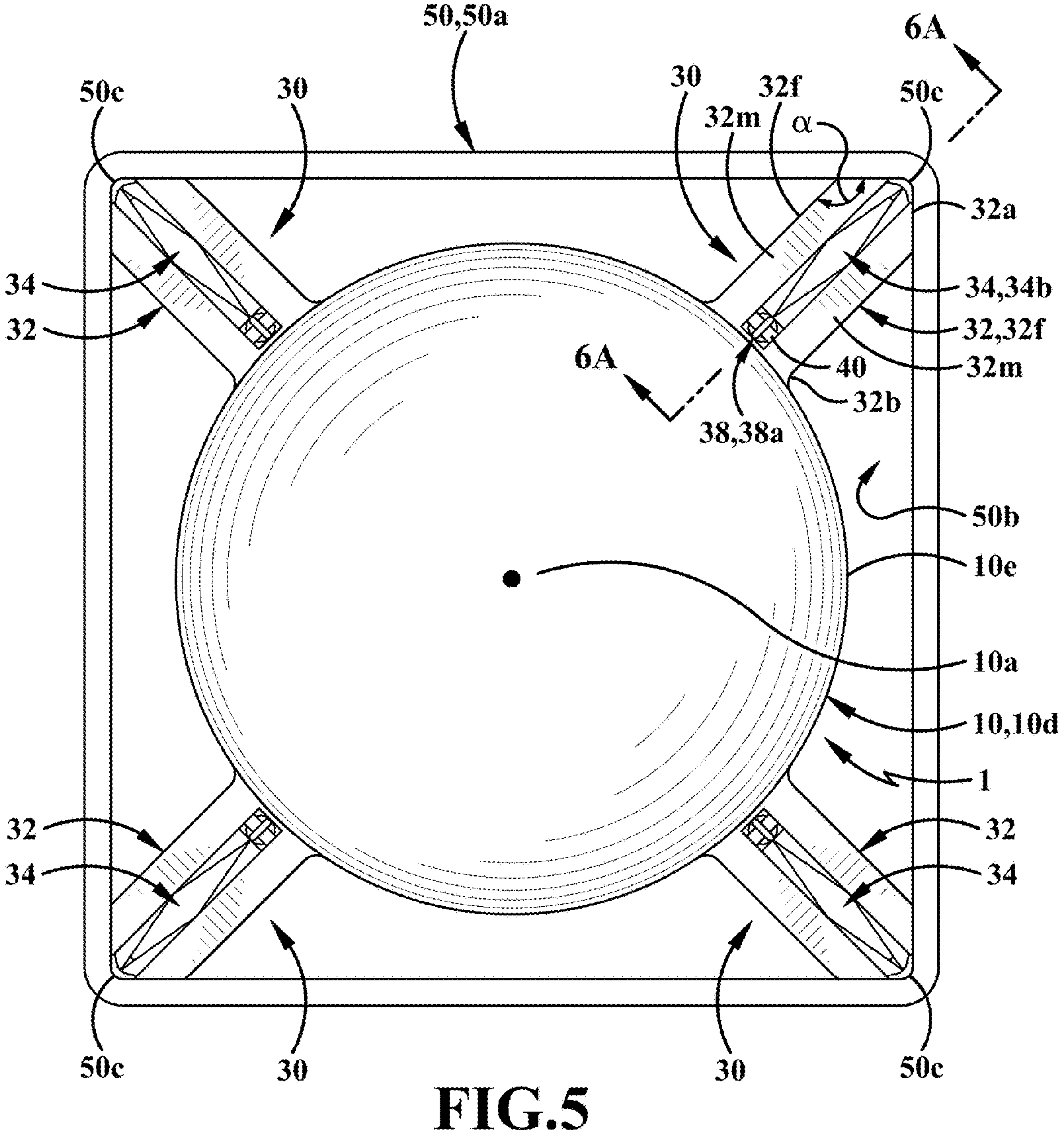
FIG. 5 (FIG. 5) is a front elevation view of the projectile equipped with the set of fin assemblies as shown in FIG. 1, wherein the projectile is loaded inside of a launch tube of a platform.

In the present disclosure, each fin 34 of the set of fin assemblies 30 defines a parallelogram-shaped cross section when viewed from a cross sectional view or a front elevation view (see FIG. 5). More particularly, each fin 34 of the set of fin assemblies 30 defines a rhombus-shaped cross section or a diamond-shaped cross section when viewed from a cross sectional view or a front elevation view (see FIG. 5).

Figure 4:
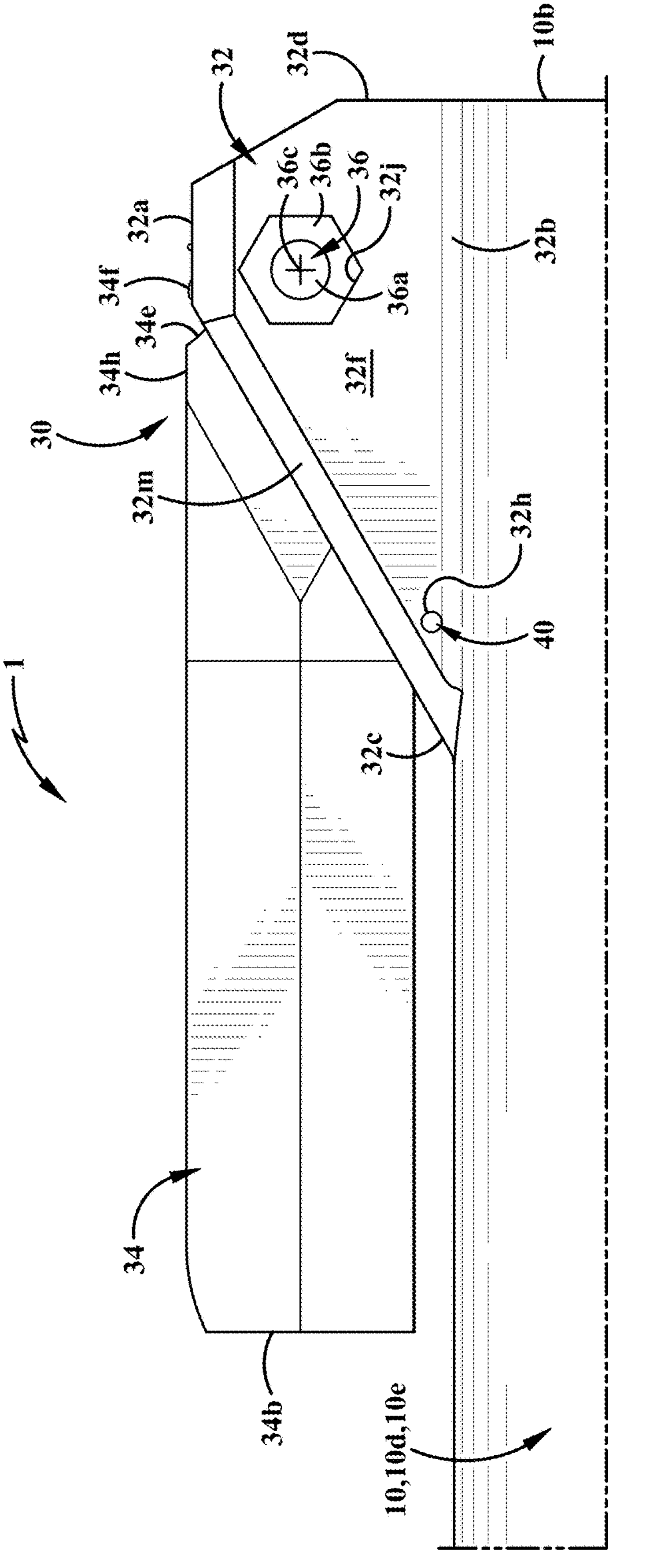
FIG. 4 (FIG. 4) is a partial side elevation view of the fin assembly shown in FIG. 2, wherein a fin of the fin assembly is in a stowed position.

Each fin assembly of the set of fin assemblies 30 also includes a pivot member 36 that pivotably engages the fin 34 with the base 32. As best seen in FIG. 3, pivot member 36 includes a connector 36*a* that is threadably engageable with a nut 36*b* of the pivot member 36. Upon assembly, the connector 36*a* passes through the fin 34, at the pivot opening 34*d*, and threadably engages with the nut 36*b*. Similarly, upon assembly, the nut 36*b* also passes through the fin 34, at the pivot opening 34*d*, and receives the connector 36*a*. It should be noted that nut 36*b* may also be held in place by the base 32 inside of the recess 32*j*; such engagement between the base 32 and the nut 36*b* may prevent the nut 36*b* from backing out of the base 32 due to unwanted loosening between the connector 36*a* and the nut 36*b*. Further, the pivot member 36 also defines a pivot axis 36*c* that extends through the connector 36*a* and the nut 36*b* once threadably engaged with one another; such pivot axis is denoted by a cross labeled 36*c* in FIG. 4. As discussed in greater detail below, the fin 34 is configured to pivot about the pivot axis 36*c* and the fin 34 pivots from the stowed position to the deployed position when the projectile 1 is launched from a launcher and is in flight.

In the present disclosure, pivot member 36 is a nut and bolt connection that engages the fin 34 with the base 32 while allowing the fin 34 to pivot freely relative to the base 32. In other exemplary embodiments, any suitable attachment and/or connection mechanisms that engages the fin 34 with the base 32 while allowing the fin 34 to pivot freely relative to the base 32 may be used herein. Examples of suitable mechanisms include rivets, press-fit components, self-clinching or interlocking components, and other suitable mechanisms of the like that engages the fin 34 with the base 32 while allowing the fin 34 to pivot freely relative to the base 32.

Each fin assembly of the set of fin assemblies 30 also includes a biaser 38. As best seen in FIGS. 3 and 6A-6B, biaser 38 includes a first end 38*a*, a second end 38*b* that is opposite to the first end 38*a*, and a biasing axis that extends between the first end 38*a* and the second end 38*b*. Upon assembly, the second end 38*b* of biaser 38 operably engages with the anchor 34*f* such that the first end 38*a* is latched to the anchor 34*f*. Upon assembly, the first end 38*a* of the biaser 38 operably engages with a retaining pin 40 of the fin assembly 30 such that the second end 38*b* is latched to the retaining pin 40. It should be noted that retaining pin 40 also engages with base 32 at the pair of front openings 32*h* and is partially housed inside of the slot 32*e* to engage with the second end 38*b* of the biaser 38.

In operation, the biaser 38 applies a biasing force to the fin 34 at the first end 34*a* of the fin 34 to force said fin 34 from the stowed position (see FIGS. 4 and 6A) to the deployed position (see FIG. 6B). In the stowed position, the biaser 38 is defined at a first length that is measured between the first end 38*a* and the second end 38*b*; such first length is denoted by a double-arrow labeled 38*c* in FIG. 6A. At the first length 38*c*, the biaser 38 is provided in an expanded position and creates a first biasing force on the fin 34 to pivot the fin 34. In the deployed position, the biaser 38 is defined at a second length that is measured between the first end 38*a* and the second end 38*b*; such second length is denoted by a double-arrow labeled 38*d* in FIG. 6B. It should be noted that the second length 38*d* is less than the first length 38*c*. At the second length 38*d*, the biaser 38 is provided in a compressed position and creates a second biasing force on the fin 34 to maintain the fin 34 at the deployed position. It should be noted that the first biasing force created at the first length 38*c* is equal with the second biasing force created at the second length 38*d* in order to maintain the fin 34 at the deployed position when the projectile 1 is in flight.

In the present disclosure, biaser 38 is shown as an extension spring that generates a biasing force in a linear, pulling direction on the fin 34 to move said fin 34 from the stowed position to the deployed position. It should be noted that any fin assembly 30 mentioned herein may include any suitable biaser or spring that generates a biasing force on the fin 34 to move said fin 34 from the stowed position to the deployed position while not requiring major structural reconfiguration to the base 32 and/or fin 34. Examples of suitable biasers that may be used in a fin assembly disclosed herein includes an extension spring, spiral spring, leaf spring, disk spring, variable-rate springs, flat springs, and other various types of springs that generates a biasing force on the fin 34 to move said fin 34 from the stowed position to the deployed position. It should be noted that torsions springs are not desired in this disclosure nor considered of use due to such torsions springs requiring a base to define a greater footprint than such base disclosed herein (e.g., base 32). With such increase in the overall dimension of the base, the air resistance or drag applied across such enlarged base will increase and thus diminish the aerodynamics of the base and the fin assembly as a whole.

In the present disclosure, projectile 1 includes four fin assemblies 30 that are formed into the body 10 of the projectile 1. In other exemplary embodiments, any suitable number of fin assemblies 30 may be equipped to the body 10 of the projectile 1 based on various reasons, including the size, shape, and length of the body 10. In other exemplary embodiments, such fin assemblies 30 may be positioned at any suitable locations along the outer profile of the projectile 1, including at an aft position, between an aft position and a fore position, and at both the aft and fore positions. In another exemplary embodiment, the fin assemblies 30 may also be removably engaged with the body 10 of the projectile 1 such that each fin assembly 30 is separable from the body 10.

Having now discussed components and parts of the projectile 1, a method of translating fins 34 of the set of fin assemblies 34 from stowed positions to deployed positions is discussed in greater detail below.

As best seen in FIGS. 5 and 6A, fins 34 of the set of fin assemblies 30 are in the stowed positions when the projectile 1 is housed and loaded into a launcher or launch tube 50 that is mounted to a platform used for military operations. In FIG. 5, each fin assembly of the set of fin assemblies 30 operably engages with a wall 50*a* of the launcher 50 inside of a chamber 50*b* defined by the launcher 50. Particularly, the angled walls 32*m* of base 32 of each fin assembly of the set of fin assemblies 30 operably engage with the wall 50*a* of the launcher 50 inside of the chamber 50*b*. While not illustrated herein, the fins 34 of the set of fin assemblies 30 may also contact rounded corners 50*c* of the launcher 50 where each rounded corner 50*c* is defined at two intersecting portions of the wall 50*a* (see FIG. 5).

In this configuration, fins 34 of the set of fin assemblies 30 are held at the stowed position due to the launcher 50 restraining the biasing force applied on the fins 34 by the biasers 38 to translate said fins 34 to the deployed position. In this stowed position, the second end 34*b* of fin 34 of each fin assembly 30 is also positioned ahead of or in front of the first end 34*a* of the fin 34 (see FIG. 6A). In the stowed position, the fin 34 is substantially parallel to the longitudinal axis 10*c* of the body 10 (see FIG. 6A). In the stowed position, the biaser 38 of each fin assembly 30 is also provided at the first length 38*c* in which the second end 38*b* of the biaser 38 is above and positioned away from the ramp 32*k* of the base 32. In the stowed position, the first side 34*g* is also positioned at the first vertical position, and the second side 34*h* is positioned at the second vertical position that is above the first vertical position. In the stowed positioned, the first side 34*g* also contacts a portion of biaser 38 while the second side 34*h* is positioned away from and/or is remote from the biaser 38. While not illustrated herein, second side 34*h* may also engage with the launcher 50 when fin 34 is provided in the stowed position.

Once projectile 1 is launched from and exits through the launcher 50 (denoted by arrow labeled "M" in FIG. 6B), each fin 34 of the fin assemblies 30 is pivoted from the stowed position (see FIG. 6A) to the deployed position (see FIG. 6B) by the respective biaser 38. Such pivoting of each fin 34 occurs once the fin 34 is no longer restricted and/or held in position by the launcher 50 thus allowing the biaser 38 to apply a biasing force on the fin 34, particularly at the anchor 34*f* of the fin 34. As best seen in FIG. 6B, the biasing force applied on the anchor 34*f* of the fin 34 by the biaser 38 pivots the fin 34 in a rearward direction towards the tail 10*b* of the body 10; such pivoting motion of the fin 34 from the stowed position to the deployed position is denoted by an arrow labeled "P" in FIG. 6B. Particularly, the biasing force applied on the anchor 34*f* of the fin 34 by the biaser 38 pivots the second end 34*b* of the fin 34 in the rearward direction towards the tail 10*b* of the body 10. The biasing force applied on the anchor 34*f* of the fin 34 by the biaser 38 also pivots the first end 34*a* of the fin 34 in a forward direction towards the nose 10*a* of the body 10.

In the deployed position, fins 34 of the set of fin assemblies 30 are held at the deployed position due to the biasing force applied by the biaser 38. In the deployed position, the biaser 38 of each fin assembly 30 is also provided at the second length 38*d* in which the second end 38*b* of the biaser 38 is positioned adjacent to the ramp 32*k* of the base 32. As discussed above, the second length 38*d* of the biaser 38 still applies a biasing force on the anchor 34*f* of the fin 34 and with the retaining pin 40 so that the fin 34 is prevented from retracting or pivoting back to the stowed position when the projectile 1 is in flight. The ramp 32*k* of base 32 also acts as a hard stop to prevent the fin 34 from over-pivoting when the projectile 1 is in flight. As such, a portion of the second side 34*h* of the fin 34 near the anchor 34*f* directly contacts the ramp 32*k* in which the ramp 32 acts as the hard stop to prevent the fin 34 from over-pivoting when the projectile 1 is in flight. In the deployed position, the first side 34*g* is also positioned above the second side 34*h*. In the deployed position, the second end 34*b* of the fin 34 of each fin assembly 30 is positioned above the top end 32*a* of the base 32 while the first end 34*a* remains below the base 32 (see FIG. 6B). In the deployed position, the second end 34*b* of fin 34 of each fin assembly 30 is also positioned behind or rearward of the first end 34*a* of the fin 34 (see FIG. 6B).

It should be understood that the fin 34 of each fin assembly of the set of fin assemblies 30 may pivot or sweep to a desired angle based on the structural configuration of the ramp 32*k* defined in the base 32. In the present disclosure, and as best seen in FIG. 6B, the fin 34 of each fin assembly of the set of fin assemblies 30 pivots 150 degrees from the stowed position (see FIG. 6A) to the deployed position (see FIG. 6B). In other exemplary embodiments, the fin 34 of each fin assembly of the set of fin assemblies 30 may pivot or sweep to any desired angle based on the structural configuration of the ramp 32*k* defined in the base 32.

Figure 7:
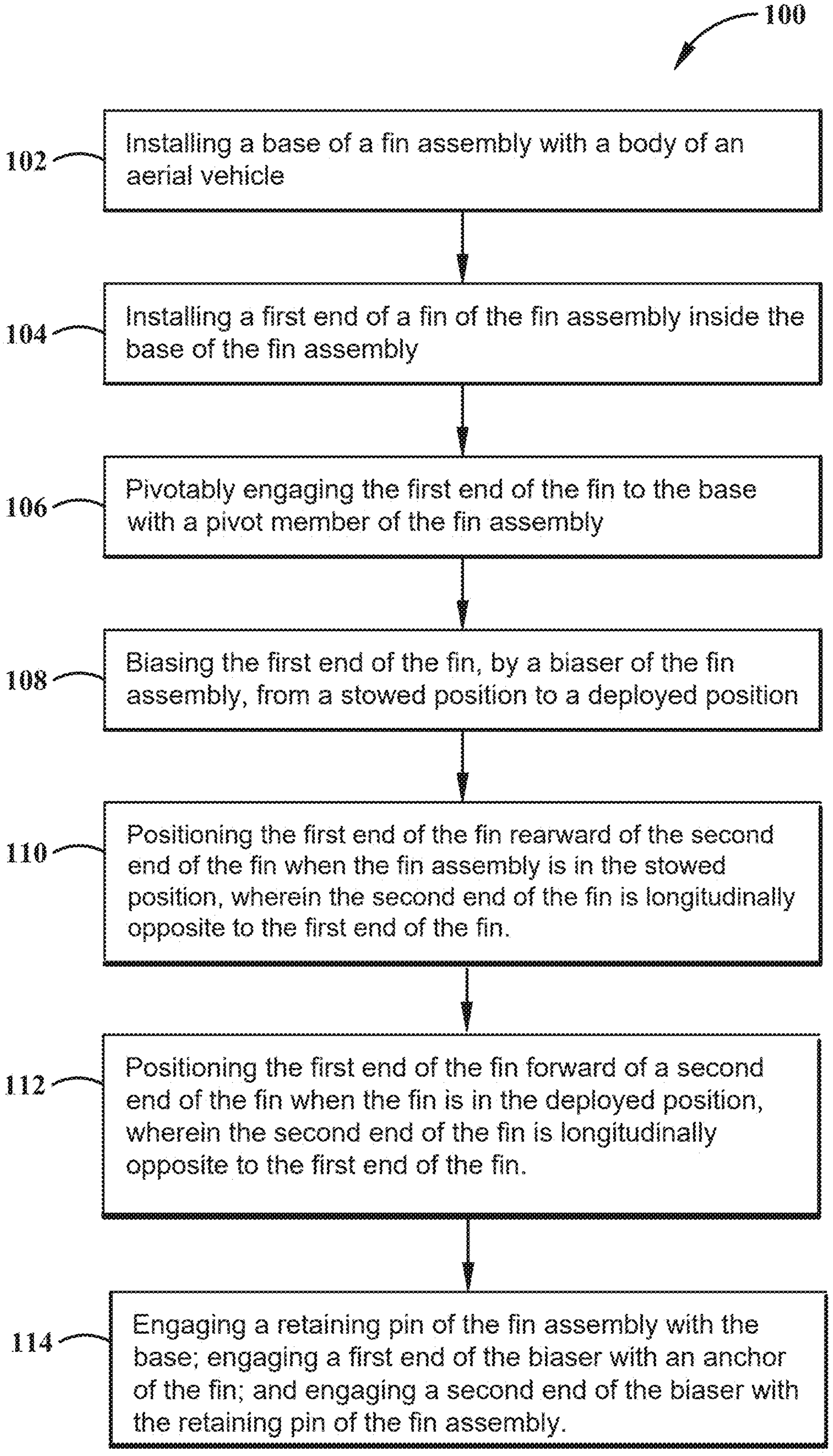
FIG. 7 (FIG. 7) is a method flowchart.

FIG. 7 illustrates a flowchart for method 100. An initial step 102 of method 100 includes installing a base of a fin assembly with a body of an aerial vehicle, wherein the base is positioned on an outer surface of the body. Another step 104 of method 100 includes installing a first end of a fin of the fin assembly inside the base of the fin assembly. Another step 106 of method 100 includes pivotably engaging the first end of the fin to the base with a pivot member of the fin assembly. Another step 108 of method 100 includes biasing the first end of the fin, by a biaser of the fin assembly, from a stowed position to a deployed position.

In other exemplary embodiments, method 100 may include optional and/or additional steps of deploying a fin assembly of a projectile. In one exemplary embodiment, method 100 may further include a step 110 of positioning the first end of the fin behind a second end of the fin when the fin of the fin assembly is in the stowed position, wherein the second end of the fin is longitudinally opposite to the first end of the fin. In another exemplary embodiment, method 100 may further include a step 112 of positioning the first end of the fin ahead of a second end of the fin when the fin is in the deployed position, wherein the second end of the fin is longitudinally opposite to the first end of the fin. In one exemplary embodiment, method 100 may further include the steps 114 of engaging a retaining pin of the fin assembly with the base; engaging a first end of the biaser with an anchor of the fin; and engaging a second end of the biaser with the retaining pin of the fin assembly.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A projectile, comprising:

a body having a nose, a tail opposite to the nose, a chamber defined between the tail and the nose, and a longitudinal axis defined between the nose and the tail;

a payload stored in the chamber of the body;

a propulsion system equipped with the body; and a fin assembly operably engaged with the body between the nose and the tail and is positioned outside of the chamber, the fin assembly comprising:

a fin having a first end and a second end opposite to the first end, wherein the fin is moveable between a stowed position and a deployed position;

a pivot member pivotably engaging the first end of the fin with a base of the fin assembly formed with the body;

a biaser operably engaged with the fin and the base, wherein the biaser is configured to apply a biasing force on the fin to pivot the fin from the stowed position to the deployed position; and a slot defined between a top end of the base and a bottom end operably engaged with the body and being opposite to the top end, wherein the biaser and a portion of the fin are housed inside of the slot;

wherein when the fin is in the stowed position, the fin is stowed completely between the nose and the tail;

wherein when the fin is in the deployed position, a portion of the fin extends away from the nose or from the tail;

a retaining pin operably engaging the base and a first end of the biaser with one another; and an anchor extending outwardly from the fin and operably engaging a second end of the biaser and the fin with one another.

2. The projectile of claim 1, wherein when the fin is in the stowed position, the first end of the fin is rearward from the second end of the fin.

3. The projectile of claim 1, wherein when the fin is in the deployed position, the first end of the fin is forward of the second end of the fin.

4. The projectile of claim 1, wherein when the fin is in the stowed position, the fin is parallel to the longitudinal axis of the body.

5. The projectile of claim 1, wherein when the fin is in the deployed position, the fin is non-parallel to the longitudinal axis of the body.

6. The projectile of claim 5, wherein the base further comprises:

a ramp positioned inside of the slot and configured to guide the biaser inside of the slot;

wherein a portion of the ramp restrains the fin at the deployed position.

7. The projectile of claim 1, further comprising:

a first length defined between a first end of the biaser and a second end of the biaser when the fin is in the stowed position; and a second length defined between the first end of the biaser and the second end of the biaser when the fin is in the deployed position;

wherein the first length is greater than the second length.

8. The projectile of claim 1, wherein the fin of the fin assembly defines a rhombus-shaped cross section.

9. A fin assembly of a projectile, comprising:

a base formed on a body of the projectile;

a fin having a first end and a second end opposite to the first end;

a pivot member pivotably engaging the first end of the fin with the base between a stowed position and a deployed position external to a chamber of the projectile;

a biaser operably engaged with the fin and the base and positioned inside of the base, wherein the biaser is configured to apply a biasing force on the fin to pivot the fin from the stowed position to the deployed position;

a slot defined between a top end of the body and a bottom end operably engaged with the base and being opposite to the top end;

wherein the biaser and a portion of the fin are housed inside of the slot; and wherein the fin is moveable between a stowed position and a deployed position;

a retaining pin operably engaging the base and a first end of the biaser with one another; and an anchor extending outwardly from the fin and operably engaging a second end of the biaser and the fin with one another.

10. The fin assembly of claim 9, wherein when the fin is in the stowed position, the first end of the fin is rearward of the second end of the fin.

11. The fin assembly of claim 9, wherein when the fin is in the deployed position, the first end of the fin is positioned forward of the second end of the fin.

12. The fin assembly of claim 9, wherein the biaser is configured to apply a biasing force on the fin to pivot the fin from the stowed position to the deployed position.

13. The fin assembly of claim 9, wherein when the fin of each fin assembly of the set of fin assemblies is in the stowed position, the fin is parallel to a longitudinal axis of a body of the projectile.

14. The fin assembly of claim 9, wherein when the fin of each fin assembly of the set of fin assemblies is in the deployed position, the fin is non-parallel to a longitudinal axis of a body of the projectile.

15. A method, comprising:

installing a base of a fin assembly with a body of an aerial vehicle, wherein the base is positioned on an outer surface of the body;

installing a first end of a fin of the fin assembly inside the base of the fin assembly;

pivotably engaging the first end of the fin to the base with a pivot member of the fin assembly;

biasing the first end of the fin, by a biaser of the fin assembly, from a stowed position to a deployed position;

engaging a retaining pin of the fin assembly with the base;

engaging a first end of the biaser with an anchor of the fin; and engaging a second end of the biaser with the retaining pin of the fin assembly.

16. The method of claim 15, further comprising:

positioning the first end of the fin rearward of a second end of the fin when the fin of the fin assembly is in the stowed position, wherein the second end of the fin is longitudinally opposite to the first end of the fin.

17. The method of claim 15, further comprising:

positioning the first end of the fin forward of a second end of the fin when the fin is in the deployed position, wherein the second end of the fin is longitudinally opposite to the first end of the fin.

* * * * *